Figure 1:
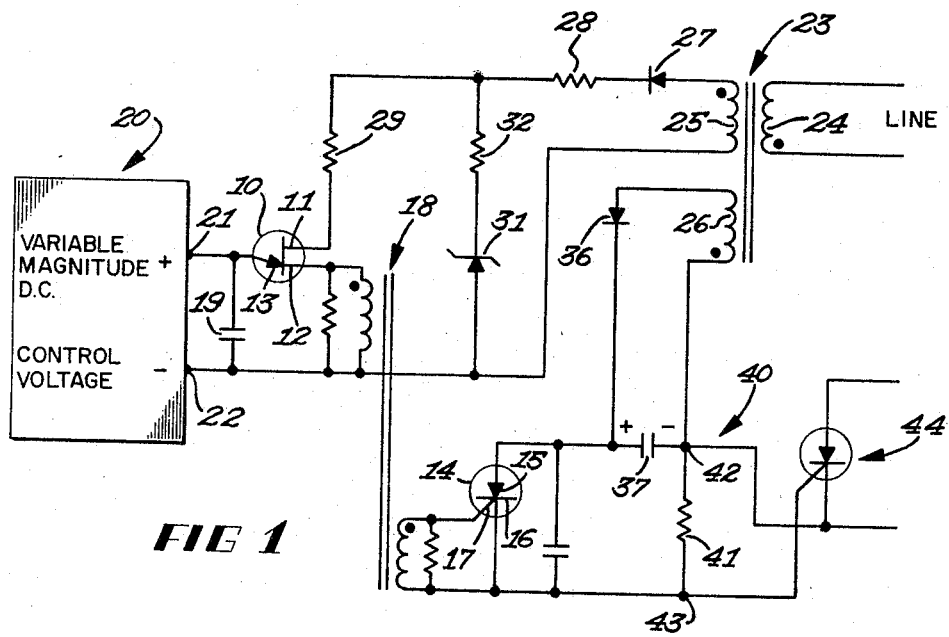

May 2, 1967    E. W. BUTTENHOFF ETAL    3,317,757
PHASE CONTROL APPARATUS PROVIDING UNIFORM OUTPUT
Filed Nov. 12, 1964

INVENTORS
EDWARD W. BUTTENHOFF
BY   JAMES W. RATZ

ATTORNEY

United States Patent Office 3,317,757
Patented May 2, 1967

3,317,757
PHASE CONTROL APPARATUS PROVIDING UNIFORM OUTPUT
Edward W. Buttenhoff, Excelsior, and James W. Ratz, Bloomington, Minn., assignors to Honeywell Inc., a corporation of Delaware
Filed Nov. 12, 1964, Ser. No. 410,638
6 Claims. (Cl. 307—88.5)

This invention is concerned with an improved control apparatus and particularly with a control apparatus which is constructed and arranged to provide an output control voltage pulse whose time of occurrence is variable in accordance with the magnitude of an input condition, and which output control voltage pulse is of a uniform quantity of electrical energy independent of the time of occurrence of the voltage pulse. Our invention is of particular utility when used to control high power controlled rectifiers, for example, silicon controlled rectifiers known as SCR's. Such controlled rectifiers require a trigger pulse containing a relatively large quantity of electrical energy in order to achieve reliable and accurate triggering of the controlled rectifier. Our improved control apparatus provides variable time control of the controlled rectifier, in accordance with the magnitude of an input control signal, by varying the time at which the controlled rectifier is rendered conductive. In order to achieve reliable triggering of the controlled rectifier, the trigger pulse itself is of a uniform and predictable quantity of electrical energy, independent of the time of occurrence of the trigger pulse.

As an example of the environment wherein our invention has found particular utility, we have utilized our invention to control controlled rectifiers which are connected to a three-phase A.C. source to provide full wave energization of a load from the three-phase source. Each of the controlled rectifiers is controlled by one of our improved control apparatus from a common condition signal, the magnitude of this condition signal being indicative of the degree of desired energization of the load.

In order to achieve an output voltage pulse having the characteristics above described, we provide a control apparatus which utilizes a structural relationship of a unijunction transistor and a control controlled rectifier such that the controlled rectifier provides the above defined output voltage pulse. The time of occurrence of this output voltage pulse is related to the time of firing of the unijunction transistor, and yet the output voltage pulse is of a uniform and predictable quantity of energy, independent of the time of firing of the unijunction transistor. We have found this structure to be particularly useful when it is desired to provide a control apparatus capable of universal application to a variety of structures to be controlled, for example, a variety of controlled rectifiers having different characteristics. With the structure of our invention, the output terminals of our control apparatus provide the output voltage pulse of the uniform and predictable quantity of electrical energy for use in triggering a power controlled rectifier, to achieve reliable control thereof.

More specifically, the structure of our invention utilizes the environment of a unijunction transistor whose output electrodes are coupled in controlled relation to the input electrodes of a control controlled rectifier, as by transformer coupling. In the preferred embodiment of our invention, this control controlled rectifier is a control SCR. A variable magnitude D.C. control voltage is adapted to be applied to the input terminals of our control apparatus to charge a control capacitor whose terminals are connected to the input electrodes of the unijunction transistor. Such a structure conventionally causes the unijunction transistor and the control SCR to fire at variable times which are related to the variable magnitude of the D.C. control voltage. We have improved this structure by providing a first half wave voltage source which is connected to the output electrodes of the unijunction transistor, as a source of operating voltage, to render this unijunction transistor operative only during a particular first half cycle. During the succeeding half cycle, operating voltage is not applied to the output electrodes of the unijunction transistor, and by virtue of the Intrinsic Stand-Off Ratio characteristic of the unijunction transistor, the control capacitor is maintained substantially discharged. The control capacitor begins to charge at the beginning of each of the defined first half cycles.

We provide a further capacitor which is connected to be charged by a second half wave voltage source during the defined succeeding half cycle. The further capacitor is connected to the output electrodes of the control SCR as a source of operating voltage. Thus, at the beginning of each of the first half cycles, this further capacitor is charged with a uniform and a predictable quantity of electrical energy. When the magnitude of the D.C. control voltage is such as to cause the unijunction transistor to fire during the defined first half wave, the uniform quantity of energy stored in the further capacitor is applied to the output terminals of our control apparatus to provide an output voltage pulse of the characteristics above mentioned.

The new and unusual result provided by our invention is achieved, in essence, by virtue of the unique structural and operational cooperation of the first and second half wave voltage sources and the manner in which the further capacitor is charged at a time during which the unijunction transistor is inoperative, the first half wave voltage source being effective during that time to maintain the control capacitor substantially discharged. By virtue of this construction, the apparatus enters the time period defined as the first half cycle with the further capacitor charged to a known quantity of energy, and with the control capacitor substantially discharged such that the charging rate of the control capacitor is determined by the magnitude of the D.C. control voltage, to cause the unijunction transistor to fire at a time during the first half cycle as determined by this magnitude. The output triggering pulse which appears at the output terminals of our control apparatus likewise occurs at this particular time and is of a controlled quantity of electrical energy as determined by the charge on the further capacitor.

Figure 2:
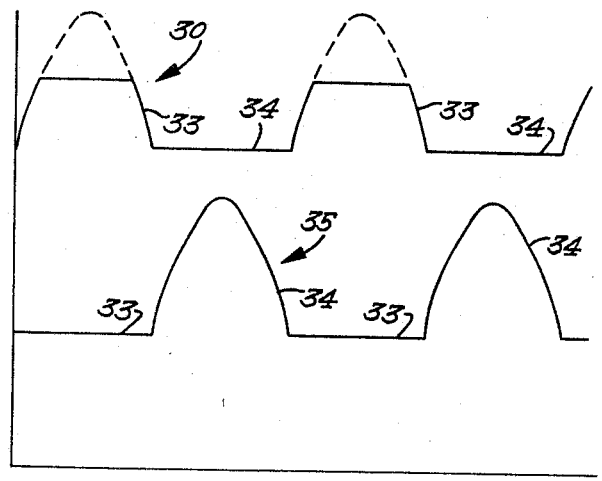

Our invention will be apparent to those skilled in the art upon reference to the following specification, claims, and drawings, of which:

FIGURE 1 is a schematic representation of an embodiment of our invention, and
FIGURE 2 is a graphical representation of the voltage applied as operating voltage to the unijunction transistor and to the control SCR of FIGURE 1.

Referring to FIGURE 1, the unijunction transistor is identified by reference numeral 10, this unijunction transistor having a first base electrode 11, a second base electrode, 12, and emitter electrode 13. Reference numeral 14 identifies a control SCR having an anode 15, a cathode 16, and the control electrode 17. The output of unijunction transistor 10 is transformer coupled to the input of control SCR 14 by means of a control transformer 18 having primary and secondary windings poled as indicated.

The input of unijunction transistor 10 includes a control capacitor 19 connected to a D.C. source of control voltage indicated at 20. The source 20 is intended to be a generalized showing of a source of condition responsive voltage which, through various structures, is controlled to provide the variable D.C. control voltage, whose magnitude is indicative of the magnitude of the condition which is being sensed. Source 20 has a positive output at terminal 21 and a negative output at terminal 22. As a result of the connection to capacitor 19, the capacitor is adapted to charge with its upper plate positive with respect to the lower plate. This upper plate is connected to emitter 13 and the lower plate is connected through the primary winding of transformer 18 (and its shunting resistor) to base electrode 12 of unijunction 10.

Reference numeral 23 identifies a power transformer whose primary winding 24 is adapted to be connected to a source of A.C. voltage, not shown. Transformer 23 includes secondary windings 25 and 26, the primary and secondary windings of this transformer being poled as indicated. Secondary winding 25 is connected through a first half wave rectification means 27 and through resistors 28 and 29 to the base electrodes 11 and 12 of unijunction transistor 10. Thus, the structure 25, 27 constitues a half wave source of operating voltage for unijunction 10. FIGURE 2 shows a voltage curve 30 which is the wave shape of the source of operating voltage applied to the base electrodes of unijunction 10. A zener diode 31 and a resistor 32 are connected to clip the peak of the half wave source of operating voltage and thus provide the wave shape shown in FIGURE 2. For purposes of definition, we define the portion of the wave shape 33 as the first half cycle and the portion of the wave shape 34 as the succeeding half cycle. This definition also applies to the voltage wave shape 35 shown in FIGURE 2, this voltage wave shape being the operating voltage applied to the anode and cathode of control SCR 14.

The secondary winding 26 of transformer 23 is connected by means of a second half wave rectification means 36 to charge a further capacitor 37. The voltage wave shape applied to capacitor 37 is shown in FIGURE 2 as the voltage curve 35. It will be noted that capacitor 37 charges during the defined succeeding half cycle 34, during which half cycle operating voltage is not applied to the base electrodes of unijunction 10.

Capacitor 37 is connected through an output load means, generally defined by reference numeral 40, to the anode and cathode electrodes of control SCR 14. The voltage present at capacitor 37 is the source of operating voltage for control SCR 14. We have shown the output load means as comprising a resistor 41 having terminals 42 and 42 connected to the input electrode of an output power SCR 44. As we have mentioned, our invention has particular utility wherein the output of the control apparatus comprises terminals 42 and 43, these terminals being adapted to be connected to control any one of a variety of output power SCR's. SCR 44 has its output electrodes connected in circuit with a load and a source of A.C. voltage which is phased to place a positive voltage on the anode of the SCR during the defined first half cycle.

Referring now to the operation of our improved control apparatus, it will first be assumed that the source of A.C. voltage 23 is operating in the defined succeeding half cycle 34. During this half cycle, operating voltage is not applied to the base electrodes 11 and 12 of unijunction 10 and, due to the Intrinsic Stand-Off Ratio characteristic of the unijunction transistor, capacitor 19 remains substantially discharged during this half cycle. Furthermore, during this half cycle of the A.C. source, capacitor 37 receives a charge of electrical energy, being charged to the polarity indicated in FIGURE 1.

During the defined first half cycle of the A.C. source, which immediately follows the defined succeeding half cycle, operating voltage is applied to the base electrodes of unijunction 10 and capacitor 19 then begins to charge. The charge accumulated on capacitor 19 at any given time is determined by the voltage magnitude of the source 20. It will be asumed that sometime during this half cycle sufficient magnitude of voltage is accumulated on capacitor 19 to cause unijunction 10 to fire. The firing of this unijunction transistor provides a triggering pulse of voltage to the input electrodes of control SCR 14 and this SCR is rendered conductive. Capacitor 37 now discharges through the output electrodes of control SCR 14 and an output pulse of voltage is provided across resistor 41, the lower terminal 43 of this resistor being positive with respect to the upper terminal 42. The characteristics of the voltage developed across resistor 41 are particularly unique in that while the time of occurrence of the voltage is variable and indicative of the magnitude of source 20, the quantity of electrical energy present in the pulse is not variable with the magnitude of source 20, or with the time of firing of unijunction 10. For any condition in which capacitor 19 is charged sufficiently during the first half cycle to fire unijunction 10, a uiform and predictable quantity of electrical energy is provided as a trigger source of voltage across resistor 41. Thus, a variable phase control trigger voltage is previded at output 42–43. This trigger voltage may be used to reliably trigger the output power SCR 44.

From the above description it can be seen that we have provided a unique control apparatus which, with a relatively simple construction, provides a phase control trigger voltage pulse of predictable characteristic. Other embodiments of our invention will be apparent to those skilled in the art and it is therefore intended that the scope of our invention be limited solely by the scope of the appended claims.

We claim as our invention:
1. In combination
a unijunction transistor having a pair of base electrodes and an emitter electrode,
a transformer having a primary and a secondary winding,
first half wave rectification means,
first circuit means connecting said base electrodes through said primary winding and said first rectification means to a source of A.C. voltage in a manner to apply half wave energizing voltage to said base electrodes,
first capacitor means connected between said emitter electrode and one of said base electrodes, said first capacitor means being maintained in a discharged state during the alternate half cycles of the A.C. source in which operating voltage is not applied to said base electrodes,
second half wave rectification means,
second capacitor means connected through said second rectification means to the source of A.C. voltage in a manner to be charged during said alternate half cycles,
a controlled rectifier having cathode, anode and gate electrodes,
second circuit means connecting said secondary winding to said gate and cathode electrodes,
output load means,
and third circuit means connecting said cathode and anode electrodes through said output load means to said second capacitor means.

2. Control apparatus constructed and arranged to provide variable phase control trigger of a controlled rectifier wherein the output electrodes of a unijunction transistor are transformer coupled to the input electrodes of the controlled rectifier and a variable magnitude D.C. control voltage is adapted to charge a capacitor which is connected to the input electrodes of the unijunction transistor, the improvement comprising;
a source of A.C. voltage,
first circuit means including first half wave rectification means connecting the output electrodes of the unijunction transistor to said source of A.C. voltage to apply operating voltage to the output electrodes during a first half cycle of said source of A.C. voltage, whereby the capacitor is maintained substantially discharged during the succeeding half cycle of said source of A.C. voltage and begins to charge at the beginning of each of said first half cycles, a second capacitor, second circuit means including second half wave rectification means connecting said second capacitor to said source of A.C. voltage to charge said second capacitor during said succeeding half cycle of said source of A.C. voltage, and third circuit means including output load means connecting said second capacitor to the output electrodes of the controlled rectifier as a source of operating voltage whereby the triggering of the controlled rectifier during said first half cycle of said source of A.C. voltage results in a substantially uniform quantity of electrical energy being applied to said output load means independent of the time of trigger of the controlled rectifier.

3. Control apparatus having an unijunction transistor whose input electrodes are connected to a control capacitor which is adapted to be charged by a condition responsive signal voltage and whose output electrodes are coupled in controlling relation to the input electrodes of a controlled rectifier, the improvement comprising;

first and second sources of half wave D.C. voltage constructed and arranged to alternately provide half wave output voltage pulses, first circuit means connecting the first of said sources to the output electrodes of the unijunction transistor as a source of half wave operating voltage, to thus cause the control capacitor to begin to charge at the beginning of each half wave during which operating voltage is applied to the unijunction transistor, a further capacitor, second circuit means connecting said further capacitor to the second of said sources to charge said further capacitor during the time in which operating voltage is not applied to the output electrodes of the unijunction transistor, and output circuit means connecting said further capacitor to the output electrodes of the controlled rectifier as a source of operating voltage, whereupon the firing of the controlled rectifier causes a uniform quantity of electrical energy to be dissipated in said output circuit means independent of the time of such firing.

4. Control apparatus, comprising:

a unijunction transistor having a pair of base electrodes and an emitter electrode, a control capacitor connected between the emitter electrode and one of the base electrodes of said unijunction transistor, a source of A.C. voltage, first and second half wave rectification means connected to said source of A.C. voltage and poled to provide alternate half waves of voltage, first circuit means connecting said first rectification means to the base electrodes of said unijunction transistor to apply operating voltage thereto during a first half cycle of said source of A.C. voltage, an SCR having anode, cathode and control electrodes, a further capacitor, second circuit means connecting said second rectification means to said further capacitor to apply charging voltage thereto during the alternate half cycle of said source of A.C. voltage, third circuit means including output load means connecting said further capacitor to the anode and cathode electrodes of said SCR as a source of operating voltage, and means connecting said unijunction transistor in controlling relation to the control electrode of said SCR.

5. In a condition responsive control apparatus wherein a condition responsive D.C. voltage is utilized to charge a control capacitor, the control capacitor being connected to the input electrodes of a unijunction transistor, and in which the output electrodes of the unijunction transistor are connected in controlling relation to the input electrodes of a controlled rectifier, the improvement comprising;

power supply means providing two half wave voltage outputs, the first of said outputs providing an output voltage during a first half wave period and the second of said outputs providing an output voltage during the succeeding half wave period, first circuit means connecting the first of said outputs to output electrodes of the unijunction transistor to apply operating voltage thereto during said first half wave period, to thereby maintain the control capacitor substantially discharged during said succeeding half wave period, a further capacitor, second circuit means connecting the second of said outputs to said further capacitor to charge the same during said succeeding half wave period, load means, and third circuit means connecting said further capacitor and said load means in circuit with the output electrodes of the controlled rectifier to apply operating voltage thereto and to provide a uniform quantity of energy to be dissipated at said load means independent of the time within said first half wave period at which the unijunction transistor may fire as a result of charging of the control capacitor.

6. A control apparatus for use with a variable magnitude D.C. control voltage to control the time of firing of a power SCR whose anode and cathode electrodes are connected to a source of alternating voltage, the control apparatus comprising:

a unijunction transistor having a pair of base electrodes and an emitter electrode, a control capacitor connected to the emitter electrode and to one of the base electrodes of said unijunction transistor and adapted to be connected to be charged by the control voltage at a time rate dependent upon the magnitude of the control voltage, a power transformer having a primary winding and a pair of secondary windings, a control transformer having a primary winding and a secondary winding, first rectification means connecting the first secondary winding of said power transformer in series with the base electrodes of said unijunction transistor and the primary winding of said control transformer to apply half-wave operating voltage to the base electrodes of said unijunction transistor, said unijunction transistor being rendered operative during a first half cycle and being inoperative during the succeeding half cycle such that said control capacitor charges only during said first half cycle and is maintained substantially discharged during said succeeding half cycle, a control SCR having anode, cathode and control electrodes, first circuit means connecting the secondary winding of said control transformer in circuit with the control and cathode electrodes of said control SCR, a further capacitor, second rectification means connecting the second secondary winding of said power transformer in circuit with said further capacitor to charge said further capacitor during said succeeding half cycle, a load impedance, second circuit means connecting said further capacitor in series circuit with the anode and cathode of said control SCR and said load impedance to apply operating voltage to the anode and cathode of said control SCR, and output terminal means connected to said load impedance and adapted to be connected to the input electrodes of the power SCR such that the time of firing of the power SCR is directly related to the time of firing of said unijunction transistor and the triggering pulse of voltage developed at said load impedance to render the power SCR conductive is of a uniform quantity of electrical energy independent of the time of firing of said unijunction transistor.

No references cited.

ARTHUR GAUSS, *Primary Examiner.*

S. D. MILLER, *Assistant Examiner.*